(12) United States Patent
Reddy et al.

(10) Patent No.: US 10,149,102 B2
(45) Date of Patent: *Dec. 4, 2018

(54) PROVIDING DATA SERVICE OPTIONS USING VOICE RECOGNITION (71) Applicant: MICROSOFT TECHNOLOGY LICENSING, LLC, Redmond, WA (US)

(72) Inventors: Nagareddy S. Reddy, Sammamish, WA (US); Vikram Khandpur, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,097

(22) Filed: Feb. 19, 2018

(65) Prior Publication Data

US 2018/0176734 A1  Jun. 21, 2018

Related U.S. Application Data (63) Continuation of application No. 14/194,569, filed on Feb. 28, 2014, now Pat. No. 9,900,743, which is a (Continued)

(51) Int. Cl.
*H04W 4/00* (2018.01)
*H04W 4/10* (2009.01)
(Continued)

(52) U.S. Cl.
CPC ........ *H04W 4/023* (2013.01); *G01C 21/3664* (2013.01); *H04B 1/3833* (2013.01);
(Continued)

(58) Field of Classification Search
CPC ........ H04B 1/3833; H04W 4/10; H04W 4/16; H04L 65/4061; G01C 21/3608; G10L 15/00; G10L 15/26; G10L 15/265
(Continued)

(56) References Cited

U.S. PATENT DOCUMENTS 5,357,596 A   10/1994  Takebayashi et al.
6,532,446 B1   3/2003  King
(Continued)

OTHER PUBLICATIONS

"CU515 3G Music Phone Bluetooth Mobile", Retrieved From: <<http://www.lifewithlg.com/pdf/CU515/CU515P_Datasheet.pdf>>, Jan. 2007, 2 Pages.
(Continued)

*Primary Examiner* — Philip Sobutka
(74) *Attorney, Agent, or Firm* — Merchant & Gould (57) ABSTRACT Initiation of a search query is accomplished by voice direction, rather than by reading choices and texting or clicking through options. A mobile phone includes a dedicated voice query service button for generating a signal for initiating a voice enabled service session, a speaker and microphone for transducing sounds and electrical signals, a display for displaying visual information to a user, memory for storing data, a transceiver for receiving and transmitting data and a processor. The processor receives a signal generated by the service button for initiating a voice enabled service session, communicates a prompt to a user to begin speaking, stores voice data from a user and transmits the stored voice data to a server for transforming the voice data to a result satisfying the spoken voice service request.

20 Claims, 7 Drawing Sheets

Related U.S. Application Data continuation of application No. 12/163,243, filed on Jun. 27, 2008, now Pat. No. 8,700,008.

(51) Int. Cl.

| | | |
|---|---|---|
| *H04W 4/18* | (2009.01) | |
| *H04W 4/02* | (2018.01) | |
| *H04B 1/3827* | (2015.01) | |
| *H04L 29/06* | (2006.01) | |
| *G01C 21/36* | (2006.01) | |
| *H04W 4/16* | (2009.01) | |

(52) U.S. Cl.
CPC .......... *H04L 65/4061* (2013.01); *H04W 4/10* (2013.01); *H04W 4/16* (2013.01)

(58) Field of Classification Search
USPC .......................... 455/518–520, 414.1–414.4
See application file for complete search history.

(56) References Cited

U.S. PATENT DOCUMENTS

| | | | |
|---|---|---|---|
| 6,615,172 | B1 | 9/2003 | Bennett et al. |
| 6,772,216 | B1 | 8/2004 | Ankireddipally et al. |
| 6,850,934 | B2 | 2/2005 | Bates et al. |
| 7,117,159 | B1 | 10/2006 | Packingham et al. |
| 7,136,462 | B2 | 11/2006 | Pelaez et al. |
| 7,292,872 | B2 | 11/2007 | Pantalone et al. |
| 7,295,853 | B2 | 11/2007 | Jin et al. |
| 7,395,204 | B2 | 7/2008 | VanderBaan et al. |
| 7,529,540 | B2 | 5/2009 | Cox et al. |
| 7,624,010 | B1 | 11/2009 | Kroeker et al. |
| 7,783,486 | B2 | 8/2010 | Rosser et al. |
| 7,996,228 | B2 | 8/2011 | Miller et al. |
| 8,700,008 | B2 * | 4/2014 | Reddy ................ H04B 1/3833 455/414.1 |
| 8,731,609 | B2 | 5/2014 | Roth et al. |
| 9,900,743 | B2 * | 2/2018 | Reddy ................ H04W 4/023 |
| 2004/0093325 | A1 | 5/2004 | Banerjee et al. |
| 2004/0162674 | A1 | 8/2004 | Fan et al. |
| 2004/0249949 | A1 | 12/2004 | Gourraud et al. |
| 2005/0149516 | A1 | 7/2005 | Wolf et al. |
| 2006/0159238 | A1 | 7/2006 | Akita et al. |
| 2006/0211383 | A1 | 9/2006 | Schwenke et al. |
| 2006/0217159 | A1 | 9/2006 | Watson |
| 2006/0270430 | A1 | 11/2006 | Milstein et al. |
| 2006/0271518 | A1 | 11/2006 | Wang et al. |
| 2007/0005570 | A1 | 1/2007 | Hurst-Hiller et al. |
| 2007/0061335 | A1 | 3/2007 | Ramer et al. |
| 2007/0077919 | A1 | 4/2007 | Chiarulli et al. |
| 2007/0118520 | A1 | 5/2007 | Bliss et al. |
| 2007/0165653 | A1 | 7/2007 | Wiatrak et al. |
| 2007/0219714 | A1 | 9/2007 | Uchida et al. |
| 2007/0225049 | A1 | 9/2007 | Andrada |
| 2008/0005251 | A1 | 1/2008 | Im et al. |
| 2008/0154611 | A1 | 6/2008 | Evermann et al. |
| 2008/0154870 | A1 | 6/2008 | Evermann et al. |
| 2008/0194279 | A1 | 8/2008 | Choksi et al. |
| 2009/0112602 | A1 | 4/2009 | Alfred et al. |
| 2009/0187410 | A1 | 7/2009 | Wilpon et al. |

OTHER PUBLICATIONS

"User's Guide for Nokia 5300", Retrieved From <<http://nds2.webapps.microsoft.com/files/support/apac/phones/guides/Nokia_5300_APAC_UG_en.pdf>>, Jan. 2007, 101 Pages.

"Final Office Action Issued in U.S. Appl. No. 12/163,243", dated Sep. 19, 2012, 15 Pages.

"Non-Final Office Action Issued in U.S. Appl. No. 12/163,243", dated Jun. 18, 2013, 10 Pages.

"Non-Final Office Action Issued in U.S. Appl. No. 12/163,243", dated Mar. 6, 2012, 14 Pages.

"Notice of Allowance Issued in U.S. Appl. No. 12/163,243", dated Nov. 20, 2013, 10 Pages.

"Final Office Action Issued in U.S. Appl. No. 14/194,569", dated Apr. 21, 2017, 18 Pages.

"Final Office Action Issued in U.S. Appl. No. 14/194,569", dated Jan. 21, 2016, 16 Pages.

"Non-Final Office Action Issued in U.S. Appl. No. 14/194,569", dated Jul. 5, 2016, 19 Pages.

"Non-Final Office Action Issued in U.S. Appl. No. 14/194,569", dated Oct. 9, 2014, 11 Pages.

"Non-Final Office Action Issued in U.S. Appl. No. 14/194,569", dated May 15, 2015, 15 Pages.

"Notice of Allowance Issued in U.S. Appl. No. 14/194,569", dated Sep. 19, 2017, 5 Pages.

"Notice of Allowance Issued in U.S. Appl. No. 14/194,569", dated Dec. 14, 2017, 5 Pages.

Acero, et al., "Live Search for Mobile: Web Services by Voice on the Cellphone", In Proceedings of the IEEE International Conference on Acoustics, Speech and Signal Processing, Mar. 31, 2008, pp. 5256-5259.

Lawson, Stephen, "Nuance Buys VoiceSignal, Eyes Mobile Voice Control", Retrieved From: <<https://www.infoworld.com/article/2664163/networking/nuance-buys-voicesignal--eyes-mobile-voice-control.html>>, May 15, 2007, 3 Pages.

O'Regan, et al., "Performance Estimation of a SIP based Push-to-Talk Service for 3G Networks", In Proceedings of the 5th European Wireless Conference, Feb. 2004, 7 Pages.

Peters, Mark, "Voice Search on your Mobile Phone", Retrieved From: <<https://web.archive.org/web/20080329011513/http://www.letsgomobile.org/en/3178/cell-phone-voice-search/>>, Mar. 27, 2008, 2 Pages.

Wang, et al., "An Introduction to Voice Search", In IEEE Signal Processing Magazine, vol. 25, Issue 3, May 2008, pp. 29-38.

* cited by examiner

PROVIDING DATA SERVICE OPTIONS USING VOICE RECOGNITION

CROSS REFERENCE TO RELATED APPLICATIONS

This application is a continuation of U.S. patent application Ser. No. 14/194,569, filed Feb. 28, 2014, entitled "Providing Data Service Options Using Voice Recognition," now U.S. Pat. No. 9,900,743, which is a continuation of U.S. patent application Ser. No. 12/163,243, filed Jun. 27, 2008, entitled "Providing Data Service Options in Push-To-Talk Using Voice Recognition," and now U.S. Pat. No. 8,700,008, the disclosures of which are incorporated by reference herein in its entirety.

BACKGROUND

Mobile value-added services (VAS) are services that are offered to differentiate mobile phone manufacturers, cellular service providers and software vendors. Often, such services are provided at a premium price. Mobile VAS include non-voice advanced messaging services such as short messaging service (SMS) and wireless data services based on wireless data bearer technologies, such as wireless local area network (WLAN), general purpose radio service (GPRS), wireless access protocol (WAP) with VAS applications including mobile gaming and global positioning services (GPS).

Mobile VAS also includes voice-based services such as push-to-talk (PTT). Push-to-talk (PTT) is a method of conversing on half-duplex communication lines. To initiate PTT, a button is pressed to transmit on the tuned frequency or channel. While the PTT button remains unpressed, any radio signals that are received on the selected channel are heard through the radio's speaker. If the radio supports full-duplex operation, received, audio may be heard while the PTT button is pressed. PTT has been adopted by cell phone carriers as a way to instantaneously send transmissions to other users on the system, emulating walkie-talkie communications on a mobile phone network. However, current PTT technologies are used only for the wireless speech communications capability. The primary advantage to PTT is the low connectivity times provided by the PTT network.

The interface for providing input to the phone has undergone many changes as mobile devices have become smarter and implement larger display screens. Providing a user-friendly menu navigation will have a significant impact on the user experience. Nevertheless, all input is currently handled by one or two fingers on the screen. Scroll wheels and QWERTY keyboards have been added to some devices to increase the ease of data entry and navigation. Recently, mobile devices have been released with touch screens surfaces, wherein input and navigation are handled by tapping on icons of choice, flicking through a scrolling menu, typing on the virtual keyboard, navigating through the playlist or initiating phone calls from a contacts area.

While these advancements provide greater ease of navigation, such user input requires a great deal of attention from the user. Recently, automobiles have been introduced with voice-enabled technology. For example, voice recognition navigation systems allow drivers to verbally communicate with the navigation system while their hands and eyes stay focused on the road. Drivers may simply press a "Talk" button and state any number of pre-set phrases, such as 'Find Nearest Hospital' or 'Find Nearest Italian Restaurant'. Nevertheless, the processing capability of such systems are limited and services offered by voice recognition systems are limited to navigation services and simple commands, such as directing a music system to begin playing a particular song.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are described for providing options for data services using push-to-talk. Initiation of a service request and navigation through PTT service functions is accomplished by voice direction, rather than by reading choices and texting or clicking through options. A mobile phone includes a dedicated push-to-talk service button for generating a signal for initiating a voice enabled service session.

According to one embodiment, options for data services using push-to-talk (PTT) are provided. A signal for initiating a voice enabled service session is received. A prompt is communicated to a user to begin speaking to provide voice data for processing of a spoken voice service request. Voice data from a user is recorded, wherein the voice data includes a spoken voice service request. The recorded voice data is transmitted to a service server for processing the voice data to satisfy the spoken voice service request.

The mobile devices may be provided with a dedicated push-to-talk service button for generating a signal for initiating a voice enabled service session, a speaker and microphone for transducing sounds and electrical signals, a display for displaying visual information to a user, memory for storing data, a transceiver for receiving and transmitting data and a processor, coupled to the PTT service button, display, memory and transceiver, the processor being configured for receiving a signal generated by the PTT service button for initiating a voice enabled service session, communicating a prompt to a user to begin speaking to provide voice data for processing of a spoken voice service request, storing in memory voice data from a user comprising the spoken voice service request and transmitting the stored voice data to a service server for transforming the voice data to a result satisfying the spoken voice service request.

A system for providing voice enabled data services in a push-to-talk (PTT) network may include a PTT server and a service server. The PTT server may be configured for receiving a signal from a mobile phone requesting a session, for sending a signal to the mobile phone indicating consent to the session for the mobile phone and for receiving voice data from the mobile phone including a voice enabled service request. The system further includes a service server coupled to the PTT server. The service server is configured for transforming the voice data to text data, for processing the text data to identify service request data for satisfying the voice enabled service request and for transmitting the identified service request data to the mobile phone.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

According to an embodiment of the present invention, voice enabling mobile services leverage existing PTT infrastructure and established PTT experiences. Navigation through PTT service functions is accomplished by voice direction, rather than by reading choices and texting or clicking through options. Also, by integrating PTT with WINDOWS LIVE™ online services allows the user to make "quick" voice queries or commands that results in low latency. This enables a better user experience than typing. Thus, voice enabling services on mobile devices according to an embodiment of the present invention facilitate PTT capability and inter-connectivity among users. The voice enabling mobile services also allows a user in one part of the country to talk to user(s) in another part of the country over the Internet or cellular data communication, e.g., WINDOWS LIVE™ Messenger (desktop or mobile).

Figure 1:
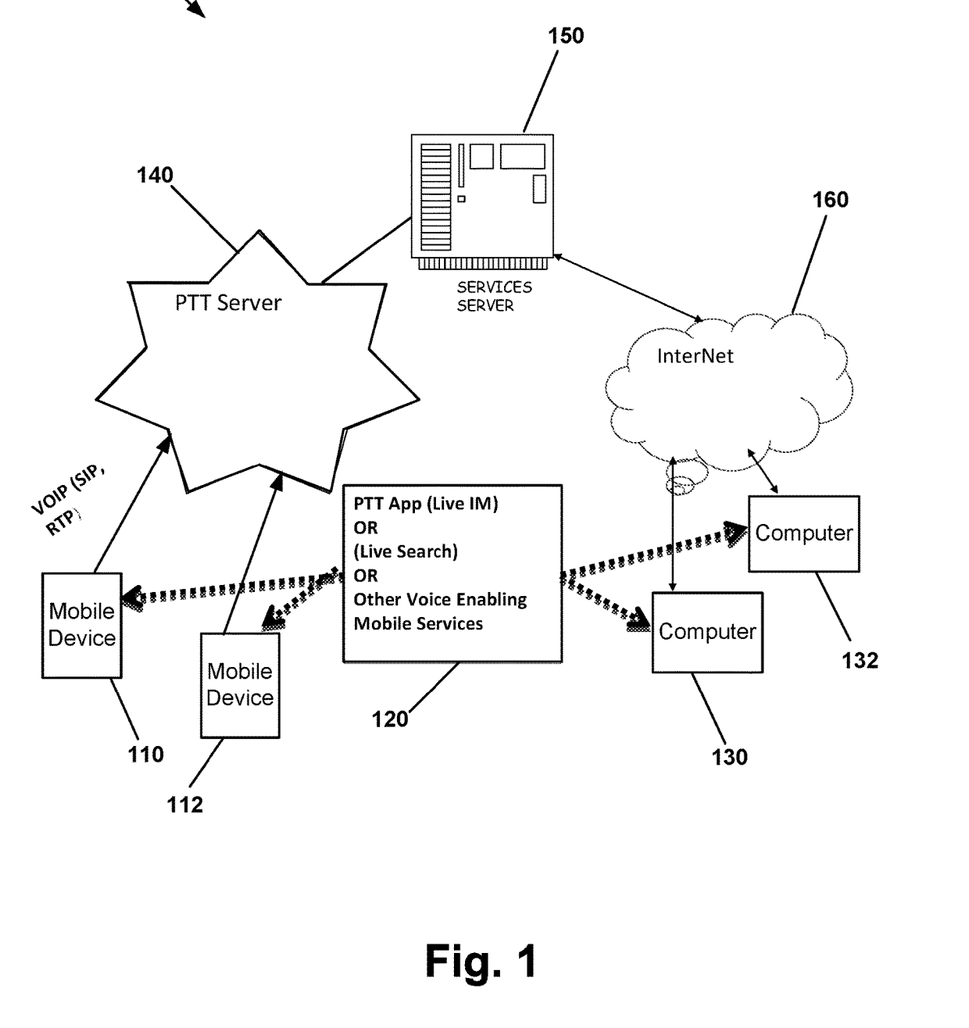
FIG. 1 illustrates a voice enabling system for mobile devices according to an embodiment of the present invention.

FIG. 1 illustrates a voice enabling system for mobile devices 100 according to an embodiment of the present invention. In FIG. 1, mobile devices 110, 112 are shown running voice enabling applications 120 for providing voice enabling mobile services, such as WINDOWS LIVE™ messenger, WINDOWS LIVE™ search, etc. Those skilled in the art will recognize that voice enabling mobile services are not limited to mobile devices 110, 112, but may also be implemented on a desktop computers 130, 132. Mobile devices 110, 112 communicate with PTT server 140 using a PTT procedure. For example, mobile device 110 may initiate a push-to-search session. Voice data is transmitted to the PTT server 140. The PTT server 140 is coupled to service server 150. Service server 150 processes the voice data. In this example, the service server 150 may retrieve location data and route the data back to the mobile device 110 via PTT server 140. Service server 150 may obtain data through the Internet 160, e.g., by contacting other computers 130, 132. Once the search response if returned to the mobile device 110, the response may be conveyed to the user of the mobile device 110 audibly or by displaying a response on a display screen of the mobile device 110.

While the service server 150 and PTT server 140 are shown as distinct entities in FIG. 1, the service server 150 may also acts as a PTT server 140 or vice versa. The service server 150 and PTT server 140 may be implemented in a cell infrastructure. Messenger extension, e.g., WINDOWS LIVE™ messenger, may also provide PTT and interwork with 2G cell subscribers. The PTT server may also be network or RF technology independent.

Accordingly, voice enabling mobile services provided via mobile devices 110, 112, PTT server 140 and service server 150 contribute substantial value to business. Further, the voice enabling mobile services provide a unique user experience to users of the mobile devices 110, 112. For example, using the voice enabling mobile services, WINDOWS LIVE™ messenger may be used for PTT instant voice communication, which is a core feature for social communicators. WINDOWS LIVE™ messenger interfaces or a WINDOWS LIVE™ client can be provided separately for other mobile makers. Voice enabling mobile services also would increase mobile usage by social communicators, WINDOWS LIVE™ messenger users, and other users that become accustomed to the ease of use of the voice enabling mobile services. The voice enabling mobile services will also encourage more data plan sales by service providers. Moreover, because PTT requires very low bandwidth, PTT service can be used in slow data networks as well. Still, 4G networks (WiMax) are primarily data networks, wherein even voice is data (VOIP). Implementing voice enabling mobile services according to an embodiment of the present invention requires the provider to play a significant role in cellular commutations, especially where a call processing infrastructure provider will be needed to implement the voice enabling mobile services.

Leveraging push-to-talk with options for data services on mobile devices 110, 112 improves the user experience by reducing the search time, reducing the cost of performing a search query and providing services that are more easily discovered by a user. For example, currently 411 services only use audio and provide limited functionality. The user has to make mental notes of listing details and is forced to listen to every option before a final result is achieved. Mobile browsers currently used on mobile devices are purely textual, which can be slow, especially on non-qwerty input devices. Because input to mobile browsers is purely textual, the user's full attention is required to type input into the browser and the length of time to type is substantial.

Mobile phones 110, 112 have communications with the PTT server and, depending upon the application, the mobile phones 110, 112 communicate with a voice enabling server. The voice services server provides additional actions, operations, capabilities and usefulness, e.g., check weather, check stock portfolio, check email, upload photographs, etc. The interface between mobile devices 110, 112 and PTT server 140/services server 150 relies on a set protocol to provide consistent and reliable communication and functionality.

Accordingly, voice enabled PTT services enable quick and easy discoverability of a new feature such as mobile search by leveraging established user behaviors around PTT service. User adoption and usage may be increased by improving the mobile search user experience. For searching, voice enabled push-to-search device delivers instant gratification to the user via the voice input and GPS location detection. Thus, the user is allowed to audibly perform functions, such as search, get directions and navigate to a listing thereby increasing end-user efficiency.

Figure 2:
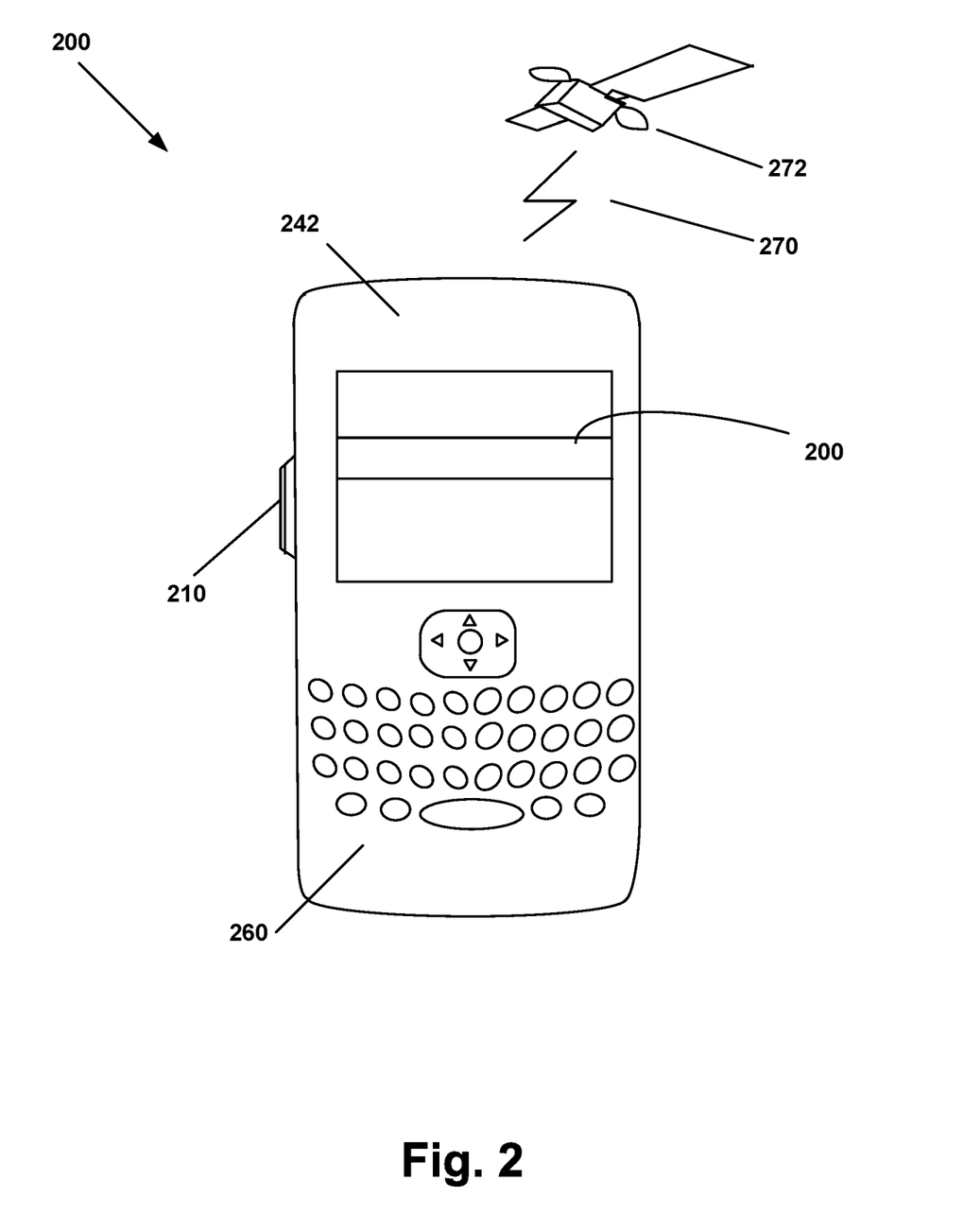
FIG. 2 illustrates a mobile device having a dedicated PTT service button according to an embodiment of the present invention.

FIG. 2 illustrates a mobile device 200 according to an embodiment of the present invention. Some of the advantages of voice enabled PTT services include provisioning of functions not previously available and making service features easily discoverable. However, to implement push-to-search functions, for example, both hardware and software support must be provided. According to an embodiment of the present invention, the user interface on the mobile device 200 is implemented as a button 210 that, when pushed, presents the user with a menu. The menu may be presented on display screen 240 as well as communicated audibly to the user through speakers 242. Multiple services may be implemented. The dedicated PTT services button 210 provides quick access for enabling the user to perform, for example, a search query using only verbal input. To initiate the push-to-search, the user engages the PTT service button 210 and speaks a search request into the microphone 260 of the mobile device 200. The mobile device 200 transmits the search request to a PTT server/service server (as shown in FIG. 1). Preferably, the signal transmitted to the PTT server from the mobile device 200 is digital. A services server then selects the correct service for the user. The PTT services on the mobile phone 200 may be implemented as plug-in elements, but must use a predetermined protocol to enable proper communication with the appropriate server. PTT services may also acquire GPS signals 270 from a GPS satellite 272 for GPS services. Nevertheless, the PTT services are independent of any particular GPS technology. Moreover, the mobile device 200 may be configured to allow simultaneous voice and data use.

While a dedicated voice enabled PTT services may be initiated by a dedicated button 210, those skilled in the art will recognize that the initiation of voice enabled PTT services may take the form of other implementations, such as a virtual button displayed on a touch sensitive screen or another existing key. The function of the button 210 may be configured to recognize a long key press that allows the user to immediately begin uttering a query and automatically receiving the user's GPS coordinates. The function of the button 210 may also be configured to recognize a short key press that allows the user to launch services without triggering a determination of the users GPS location. Speech components may be provided by an embedded voice engine to provide device side voice recognition that allows menu options to be voice enabled and identified quickly on the mobile device side.

After initiating the user interface, such as by pushing a button 210, the user provides an audible signal to the microphone 260 of the mobile phone 200 and the correct service is selected for the user. The services may be implemented as plug-in elements. Nevertheless, the predetermined protocol is used to enable proper communication with the appropriate server.

Figure 3:
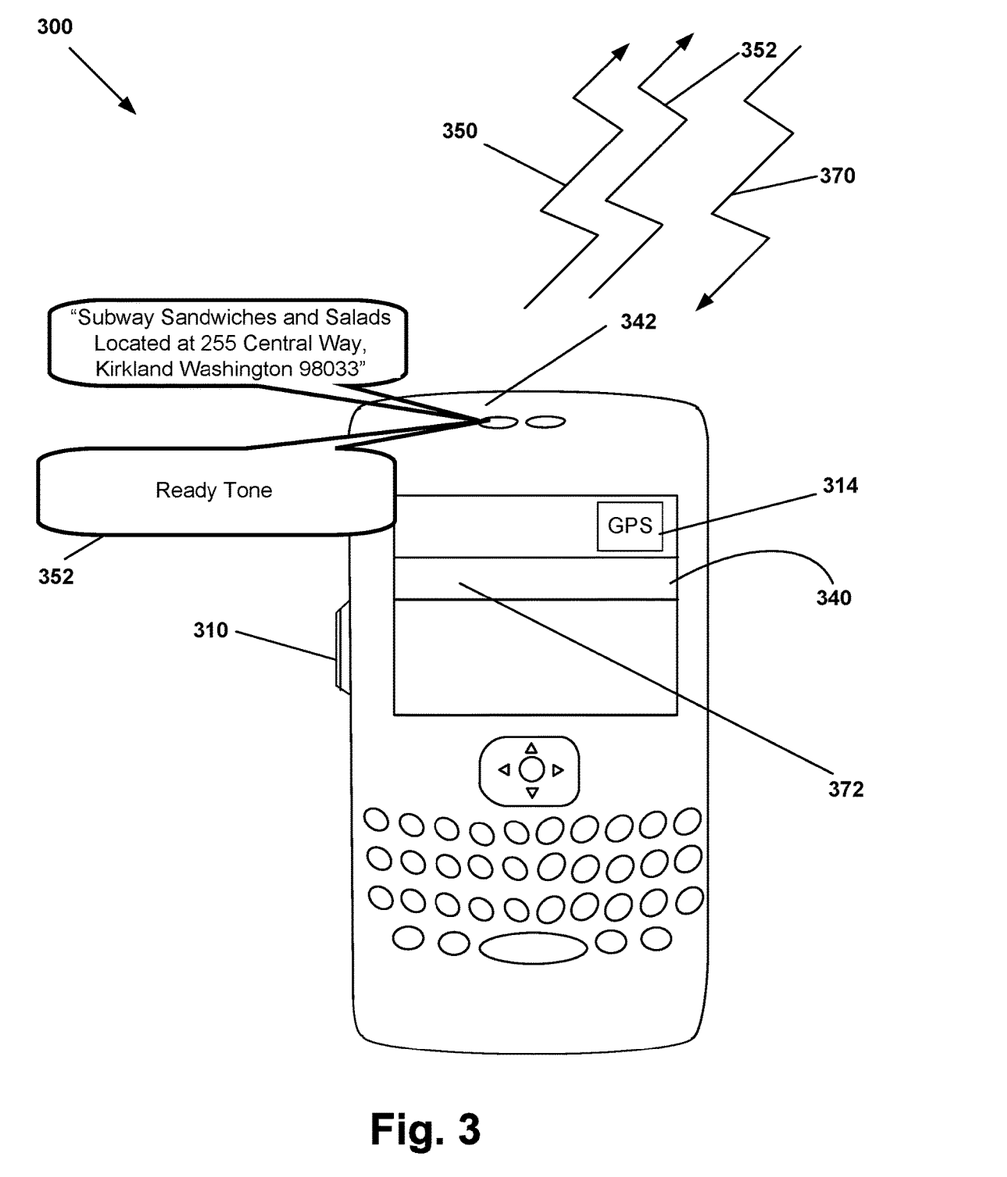
FIG. 3 illustrates a first example of a local search on a mobile device according to an embodiment of the present invention.

FIG. 3 illustrates a first scenario of a local search on a mobile device 300 according to an embodiment of the present invention. In FIG. 3, a user is travelling through a city. The user decides to stop for lunch. Because time is of essence to the user, the user may want to locate a particular type or brand of restaurant that is closest to the user's current location. Alternatively, the user may simple desire to find restaurants within a certain radius of the user's current location.

To perform the push-to-search, the user engages the PTT service button 310. The user may be prompted with a tone 312 to begin dictation of the search request. While the utterance is being recorded, a GPS module 314 on the mobile device 300 is triggered to calculate the geographic location in the background. As recording is completed, the audible data, e.g., a verbal search request 350, is routed to a PTT server. At the PTT server, the search request 350 may be converted to text.

In the meantime as soon as the geographic location of the user is determined, the GPS coordinates 352 are also routed to a PTT server. If the PTT server also implements services server functionality, a search is performed immediately against the search request 350 and the GPS location coordinates 352 provided by the mobile device 300 of the user. If the services server is a separate entity, the search request 350 and the GPS location coordinates 352 provided by the mobile device 300 of the user are routed to a services server. In any event, identified data, e.g., search results 370, are sent back to the mobile device 300 of the user. An application 372 may be invoked on the mobile device 300 and the results presented on the display screen 340. The search results 370 may be sorted according to a predetermined algorithm or according to user-defined parameters. The search results may be played back to the user through the speakers 342, thereby providing the user instant results on the user's voice activated query.

Figure 4:
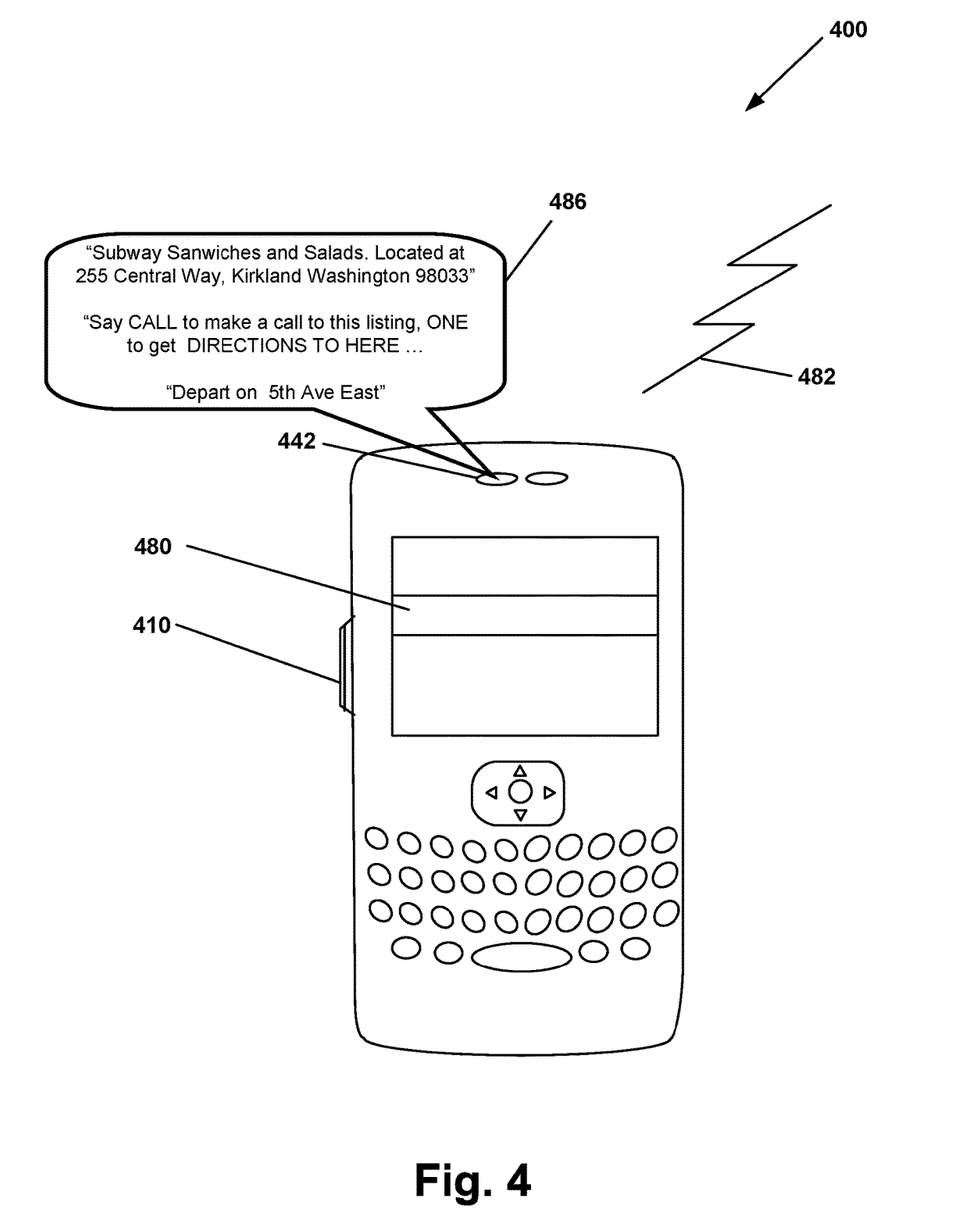
FIG. 4 illustrates selection of search results and directions on a mobile device having a dedicated PTT service button according to an embodiment of the present invention.

FIG. 4 illustrates selection of search results and directions on a mobile device 400 according to an embodiment of the present invention. The mobile device 400 shown in FIG. 4 does not differ materially from the mobile device 300 shown in FIG. 3. However, with regards to FIG. 4, the user confirms the priority selection, i.e., in this example the top most result 480 is the priority selection. The user presses the PTT services select button 410 while the listing details of the restaurant listing and address are played back to the user through the speakers 442. The PTT services select button 410 may be context sensitive so that a short press can be used as a second softkey action when in search application. The user may be presented with other options that may be chosen relevant to the selected listing. For example, the address and phone number of the priority search result 480 may be played back verbally 486 to the user via audio clips. In addition the various options applicable for the listing in the order for relevance may be played back to the user.

Then, the user may select a "Directions to here" option by holding down the PTT services select button 410 and speaking a command, e.g., "One" or "Directions to here". The GPS location coordinates of the mobile device 400 is refreshed once more and sent back to the services server. Using these current location coordinates 482 as a starting location, directions are calculated to the end location 480, i.e., the chosen restaurant. After the directions have been calculated, the directions and maps are sent back to the mobile device.

Alternatively, the user may subscribe to premium services that allow turn-by-turn directions. Thus, if the user has subscribed to the premium version of the application, the PTT services select button 410 may be used to trigger the GPS to start tracking the mobile device and command the application to "start navigation" on the route. As the user moves along the route, directions may thus be played back to the user via speakers 442.

Figure 5:
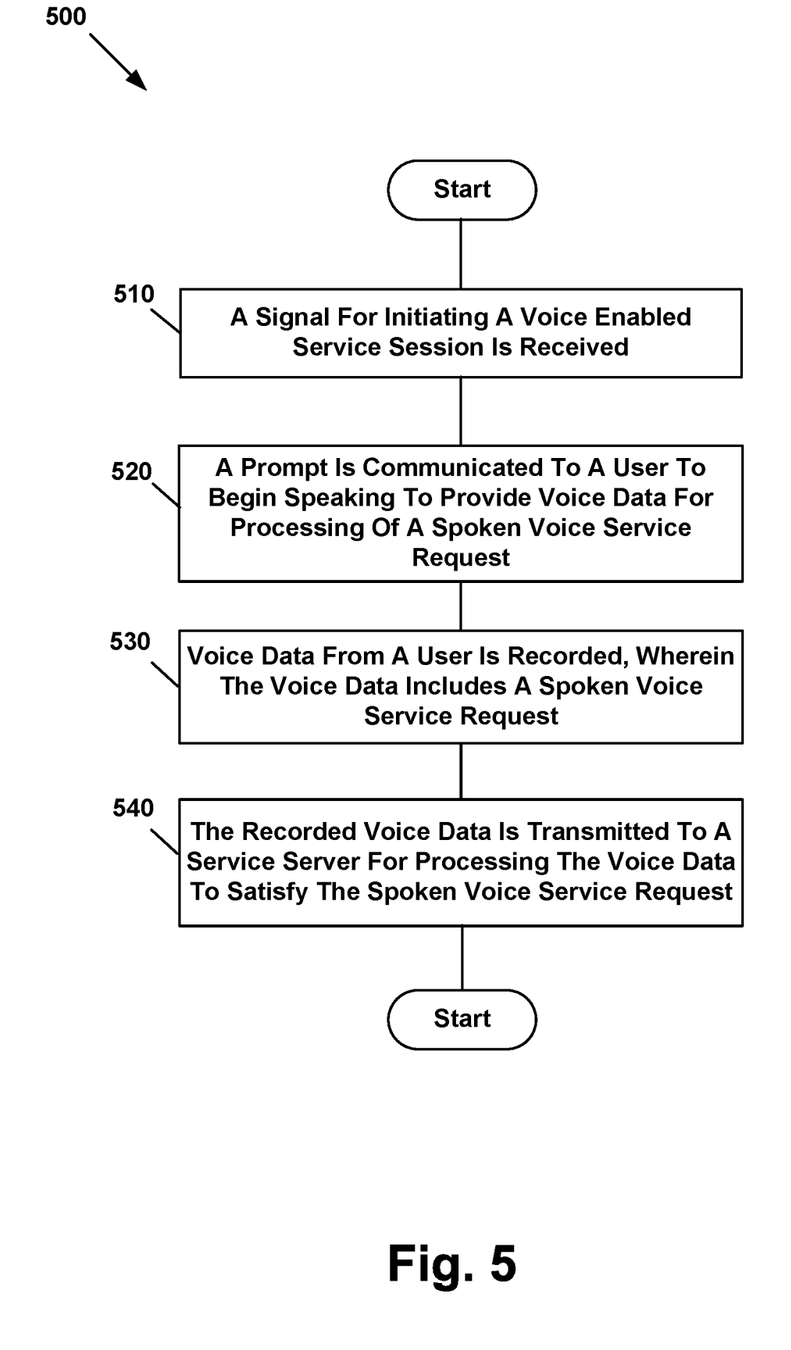
FIG. 5 is a flowchart for providing options for data services using push-to-talk (PTT) according to an embodiment of the present invention.

FIG. 5 is a flowchart for providing options for data services using push-to-talk (PTT) 500 according to an embodiment of the present invention. A signal for initiating a voice enabled service session is received 510. A prompt is communicated to a user to begin speaking to provide voice data for processing of a spoken voice service request 520. Voice data from a user is recorded, wherein the voice data includes a spoken voice service request 530. The recorded voice data is transmitted to a service server for processing the voice data to satisfy the spoken voice service request 540.

Figure 6:
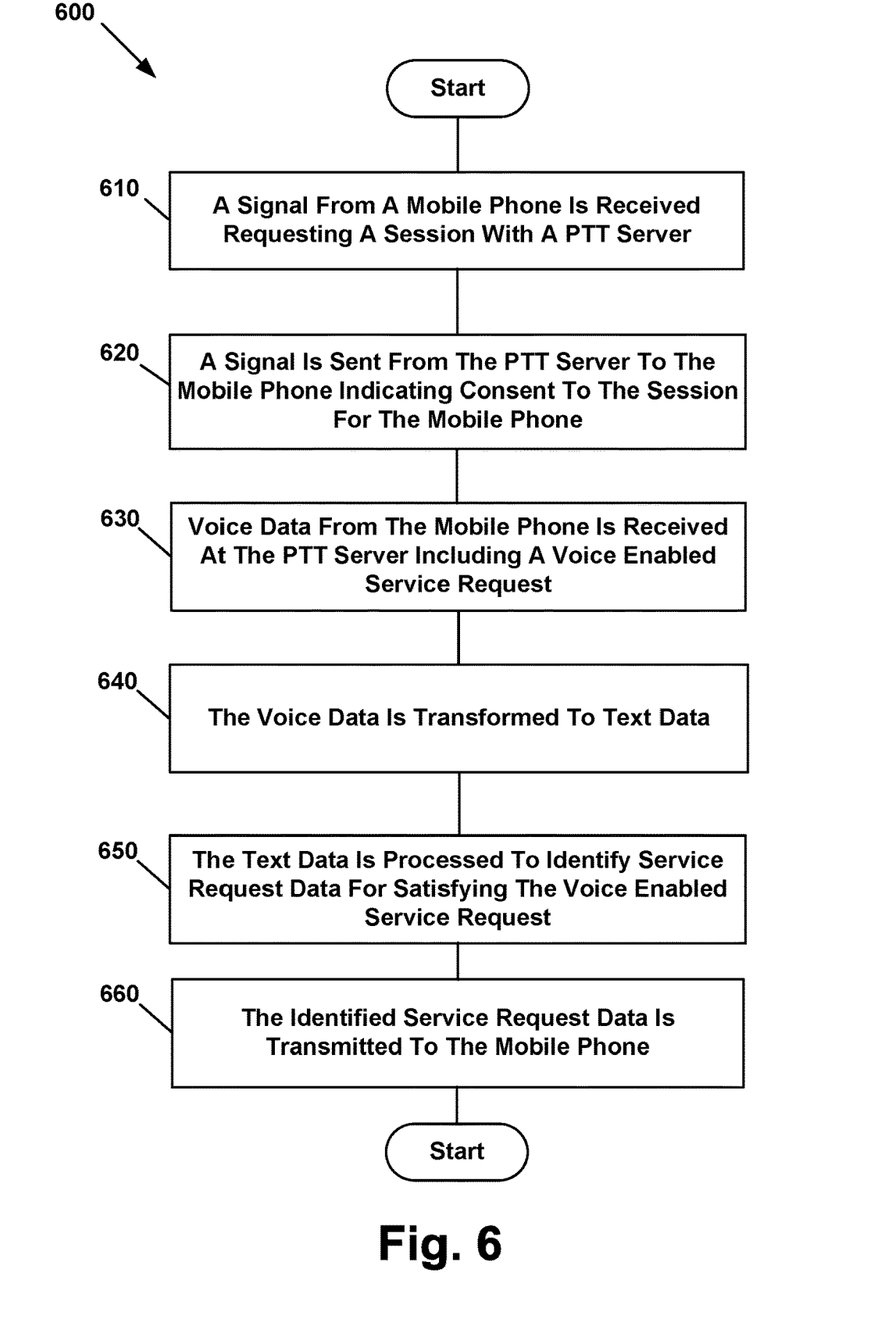
FIG. 6 is a flowchart of a process for providing options for data services in a push-to-talk (PTT) system according to an embodiment of the present invention.

FIG. 6 is a flowchart of a process for providing options for data services in a push-to-talk (PTT) system 600 according to an embodiment of the present invention. A signal from a mobile phone is received requesting a session with a PTT server 610. A signal is sent from the PTT server to the mobile phone indicating consent to the session for the mobile phone 620. Voice data from the mobile phone is received at the PTT server including a voice enabled service request 630. The voice data is transformed to text data 640. The text data is processed to identify service request data for satisfying the voice enabled service request 650. The identified service request data is transmitted to the mobile phone 660.

The systems and components described above can be implemented as part of networked, distributed, or other computer-implemented environment. The systems and components can communicate via a wired, wireless, and/or a combination of communication networks. A number of client computing devices, including desktop computers, laptops, handhelds, or other smart devices can interact with and/or be included as part of the system. In alternative embodiments, the various components can be combined and/or configured according to a desired implementation. Other embodiments and configurations are available.

Figure 7:
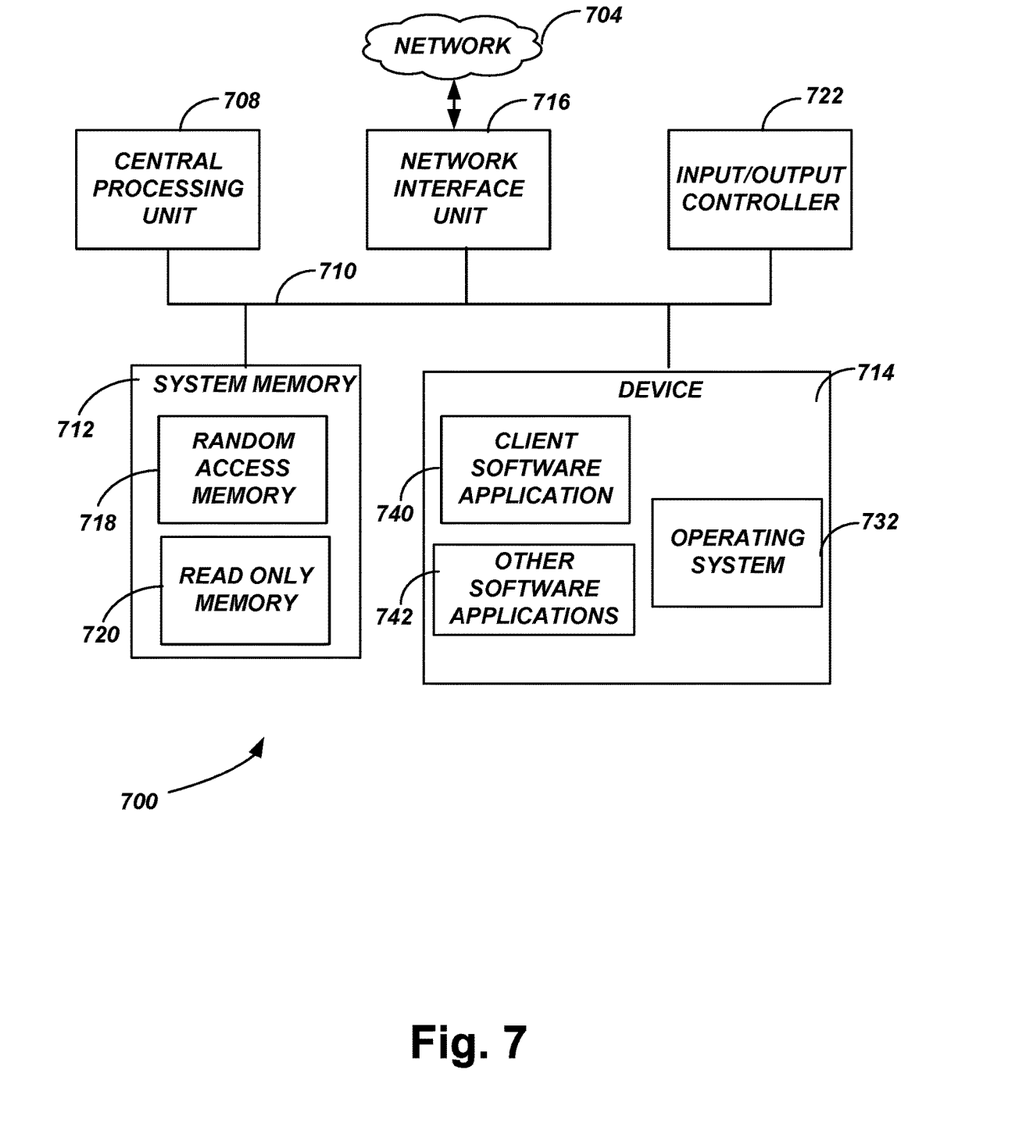
FIG. 7 illustrates an operating environment for embodiments of the invention.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 7 illustrates an operating environment for embodiments of the invention. As shown in FIG. 7, computer 700 comprises a general-purpose desktop, laptop, handheld, or other type of computer capable of executing one or more application programs. The computer 700 includes at least one central processing unit 708 ("CPU"), a system memory 712, including a random access memory 718 ("RAM") and a read-only memory ("ROM") 720, and a system bus 710 that couples the memory to the CPU 708. A basic input/output system containing the basic routines that help to transfer information between elements within the computer, such as during startup, is stored in the ROM 720. The computer 700 further includes a device 714 for storing an operating system 732, application programs, and other program modules.

Device 714 is connected to the CPU 708 through a controller (not shown) connected to the bus 710. Device 714 and its associated computer-readable media provide non-volatile storage for the computer 700. The description of computer-readable media contained herein may refer to a storage device, such as a hard disk or CD-ROM drive, or any available media that can be accessed or utilized by the computer 700.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 700.

According to various embodiments of the invention, the computer 700 may operate in a networked environment using logical connections to remote computers through a network 704, such as a local network, the Internet, etc. for example. The computer 700 may connect to the network 4 through a network interface unit 716 connected to the bus 710. It should be appreciated that the network interface unit 716 may also be utilized to connect to other types of networks and remote computing systems. The computer 700 may also include an input/output controller 722 for receiving and processing input from a number of other devices, including a keyboard, mouse, etc. (not shown). Similarly, an input/output controller 722 may provide output to a display screen, a printer, or other type of output device.

As mentioned briefly above, a number of program modules and data files may be stored in device 714 and RAM 718 of the computer 700, including an operating system 732 suitable for controlling the operation of a networked personal computer, such as the WINDOWS® operating systems from MICROSOFT CORPORATION of Redmond, Wash. Device 714 and RAM 718 may also store one or more program modules. In particular, device 714 and the RAM 718 may store client application programs 740 and other software applications 742. A computer 700, as illustrated in FIG. 7, may be configured to execute instructions that perform the operations of embodiments of the present invention and may be implemented in at least one of mobile devices 110, 112, PTT server 140 and services server 150 as shown in FIG. 1.

It should also be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A non-transitory computer storage medium containing computer-readable instructions for providing a voice search query, the computer-readable instructions, when executed by a computing device, configure the computing device to:
   receive a signal to initiate a spoken search request;
   communicate a prompt to receive the spoken search request;
   receive voice data comprising the spoken search request;
   transmit the voice data from the computing device to a server;
   receive a response to the spoken search request from the server, wherein the response includes a plurality of search results based on the spoken search request;
   present the plurality of search results on a display screen of the computing device;
   present a verbal response relating to the plurality of search results via a speaker of the computing device, wherein the verbal response includes an option for interacting with the plurality of search results; and
   receive a spoken command relating to the option for interacting with the plurality of search results, wherein the spoken command is transmitted to the server to provide an updated response at the computing device.

2. The non-transitory computer storage medium of claim 1, the instructions further configuring the computing device to display a virtual button on the display screen, wherein activation of the virtual button causes the computing device to receive the signal to initiate the spoken search query.

3. The non-transitory computer storage medium of claim 1, the instructions further configuring a talk button on the computing device to receive the signal to initiate the spoken search query.

4. The non-transitory computer storage medium of claim 1, the instructions further configuring the computing device to transmit current location coordinates to the server, wherein the plurality of search results include at least one listing associated with the current location coordinates of the computing device.

5. The non-transitory computer storage medium of claim 4, wherein the updated response includes providing directions to a location associated with the at least one listing.

6. The non-transitory computer storage medium of claim 5, the instructions further configuring the computing device to present the directions via a map on the display screen.

7. The non-transitory computer storage medium of claim 1, the instructions further configuring the computing device to transform at least part of the voice data to text data at the computing device.

8. A method for providing a voice search query on a mobile device comprising:
   receiving a signal at the mobile device to initiate a spoken search request;
   communicating a prompt to receive the spoken search request;
   receiving voice data comprising the spoken search request;
   transmitting the voice data to a server;
   receiving, at the mobile device, a response to the spoken search request from the server, wherein the response includes a plurality of search results and a priority search result comprising a top most one of the plurality of search results;
   presenting the plurality of search results on a display of the mobile device;
   presenting a verbal response relating to the priority search result via a speaker on the mobile device; and
   receiving a spoken command at the mobile device relating to the priority search result, wherein the spoken command is transmitted to the server to provide an updated response at the mobile device.

9. The method of claim 8, wherein the updated response includes calling a phone number associated with the priority search result.

10. The method of claim 8, further comprising transmitting current location coordinates from the mobile device to the server, wherein the updated response includes directions to a location associated with the priority search result.

11. The method of claim 8, wherein receiving the signal at the mobile device to initiate the spoken search request comprises a user pressing either a dedicated push-to-talk button on the mobile device or a virtual button displayed on a touch sensitive screen of the mobile device.

12. The method of claim 8 further comprising transmitting current location coordinates from the mobile device to the server, wherein the displayed search results include at least one listing associated with the current location coordinates of the mobile device.

13. The method of claim 8 further comprising transforming the voice data to text data at the server.

14. The method of claim 8 further comprising transforming at least part of the voice data to text data at the mobile device.

15. A mobile device for providing a voice search query comprising:
   a microphone to receive voice data;
   a display screen to provide visual information;
   a speaker;
   a memory for storing data; and
   a processor, coupled to the microphone, the display screen, the speaker and the memory, the processor being configured to:
      receive a signal to initiate a spoken search query;
      communicate a prompt to receive the spoken search query;
      receive voice data comprising the spoken search query;
      transmit the voice data from the mobile device to a server;
      receive a response to the spoken search query from the server, wherein the response includes a search result based on the spoken search query;
      present the search result on the display screen;
      present a verbal response relating to the search result via the speaker, wherein the verbal response includes an option for interacting with the search result; and
   receive a spoken command relating to the option for interacting with the search result, wherein the spoken command is processed at the server to provide an updated response at the mobile device.

16. The mobile device of claim 15, wherein the updated response includes calling a phone number associated with the search result.

17. The mobile device of claim 15, wherein the processor is further configured to display a virtual button on the display screen, wherein activation of the virtual button causes the processor to receive the signal to initiate the spoken search query.

18. The mobile device of claim 15, wherein the processor is further configured to transmit current location coordinates from the mobile device to the server, and wherein the search result includes at least one listing associated with the current location coordinates of the mobile device.

19. The mobile device of claim 18, wherein the spoken command comprises a request for directions to the at least one listing, and wherein the updated response includes directions to an address associated with the at least one listing.

20. The mobile device of claim 19, wherein the processor is further configured to present the directions to the address via a map on the display screen.

* * * * *